Patented Sept. 28, 1948

2,450,072

UNITED STATES PATENT OFFICE 2,450,072

PAINT PASTE

Adolfo Cornelio Saavedra Zavaleta, Buenos Aires, Argentina

No Drawing. Application October 30, 1945, Serial No. 625,677. In Argentina November 13, 1944

1 Claim. (Cl. 106—79)

This invention relates to paint pastes.

Several paint pastes have been proposed and used heretofore, but due to the nature of the basic components thereof, said pastes have only admitted certain oily or aqueous combinations and were also only adapted for certain uses, to such an extent that paints in general are classified by their use, apart from their quality grade and type.

Experiments have been directed towards the production of a paste compatible with any diluent, and particularly with oil and water, and satisfactory results have been obtained by combining two bases originally incompatible with each other, linked by an emulsifier acting so as to render said bases miscible.

The paint paste of the present invention involves the use of a sodium boro-caseinate with silicate for a water base, and a combination of cooked linseed oil, lithopone and zinc oxide for an oil base which with castor oil and sulphuric acid as an emulsifier, is incorporated into the water base in such a manner that the resulting product will remain as an excipient paste for forming a paint with any suitable pigment or dye, all of which is capable of being diluted in oily substances as well as in aqueous substances, lacquers and other means used for the purpose.

Regardless of the substance with which the paste is diluted, the resulting paint is odorless and essentially adhesive, whereby it may be applied on any surface, either by means of a brush or of an atomizer. The paint prepared with this paste is also very elastic, even after it is dry, and therefore will not crack.

An object of the invention is to provide a paint which will permit the formation of a smooth surface, since the resulting paint is slow-drying and therefore self levelling.

A further object of the invention is to secure steady colors, which will not fade even under the strong effects of light.

A further object of the invention is to obtain a permanent brightness which will not be altered by foreign agents, since apart from containing stabilizing substances, the components prevent all possible formation of fungus and mould.

A still further object of the invention is to provide a paste which will render the paint practically incombustible, since due to the presence of silicate, the paint will stand high temperatures.

Other objects and advantages of the present invention will become apparent from the course of the following description.

As stated above, the composition comprises two bases with an emulsifier.

| | Parts |
|---|---|
| Base for water: | |
|   Casein | 200 |
|   Borax | 5 |
|   Sodium silicate | 5 |
| Emulsifier: | |
|   Castor oil | 200 |
|   Sulphuric acid | 5 |
| Base for oil: | |
|   Cooked linseed oil | 500 |
|   Lithopone | 300 |
|   Zinc oxide | 200 |

The compound is obtained without heating and under normal pressure by first preparing the water base, for which purpose the casein, borax and sodium silicate are mixed in the proportions indicated, thereby obtaining a boro-caseinate of sodium with silicate.

The emulsifier, that is to say, the castor oil with sulphuric acid in the proportions indicated, is prepared separately, and this emulsifier is incorporated to the water base.

After this has been done, the 500 parts of cooked linseed oil are added, and finally the lithopone and zinc oxide are incorporated as a charge, forming a general mixture and producing an excipient paste for any paint, which is completed with a pigment or dye intimately mixed therewith.

Apart from serving as a means for associating the water base and the oil base in a single product, the emulsifier will also act to unify the pigment, so that the color will be substantially uniform.

As stated above, due to the presence of the two suitably conditioned bases, the resulting paste may be diluted in both water and oil; whether used as a water paint or as an oil paint, upon being applied it will penetrate easily and will strongly adhere to any surface, without alteration due to cracking, light effects, etc.; also, due to the elastic property given by the various components, the paint will maintain the necessary flexibility to accompany the surfaces, even when the latter is flexed.

It is evident that in carrying the invention into practice, several modifications may be made in the proportions and details of production of the paste, without departing from the scope of the invention as clearly set forth in the appended claim.

I claim:

A paint paste composed of a base for water comprising about 200 parts, by weight, of casein, about 5 parts, by weight, of borax, and about 5 parts, by weight, of sodium silicate, and a base for oil comprising about 500 parts, by weight, of cooked linseed oil, 300 parts, by weight, of lithopone, and about 200 parts, by weight, of zinc oxide, both of said bases being combined with an emulsifier comprising about 200 parts, by weight, of castor oil, and about 5 parts, by weight, of sulphuric acid.

ADOLFO CORNELIO SAAVEDRA ZAVALETA.

REFERENCES CITED

The following references are of record in the file of this patent:

UNITED STATES PATENTS

| Number | Name | Date |
|---|---|---|
| 1,048,536 | Horn | Dec. 31, 1912 |
| 1,647,666 | Rogers | Nov. 1, 1927 |
| 1,777,162 | Biddle | Sept. 30, 1930 |
| 2,084,486 | Flood et al. | June 22, 1937 |

FOREIGN PATENTS

| Number | Country | Date |
|---|---|---|
| 96,322 | Switzerland | Nov. 14, 1918 |
| 120,471 | Great Britain | Oct. 1922 |